(12) United States Patent
Villaizan (10) Patent No.: US 11,727,922 B2
(45) Date of Patent: *Aug. 15, 2023

(54) SYSTEMS AND METHODS FOR DERIVING EXPRESSION OF INTENT FROM RECORDED SPEECH

(71) Applicant: Verint Americas Inc., Alpharetta, GA (US)

(72) Inventor: Moshe Villaizan, Stamford, CT (US)

(73) Assignee: Verint Americas Inc., Alpharetta, GA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/317,292

(22) Filed: May 11, 2021

(65) Prior Publication Data

US 2021/0304739 A1      Sep. 30, 2021

Related U.S. Application Data

(63) Continuation of application No. 15/875,054, filed on Jan. 19, 2018, now Pat. No. 11,011,160, which is a
(Continued)

(51) Int. Cl.
*G10L 15/02*     (2006.01)
*G10L 15/18*     (2013.01)
(Continued)

(52) U.S. Cl.
CPC .......... *G10L 15/1815* (2013.01); *G10L 15/02* (2013.01); *G10L 25/51* (2013.01); *G10L 2015/088* (2013.01)

(58) Field of Classification Search
None
See application file for complete search history.

(56) References Cited

U.S. PATENT DOCUMENTS 9,576,574 B2 * 2/2017 van Os .................... G10L 15/22
2007/0282601 A1 * 12/2007 Li ........................ G10L 19/005
704/207
(Continued)

OTHER PUBLICATIONS

Monaural Sound. What Does Monaural Sound Mean? https://www.techopedia.com/definition/31085/monaural-sound (Monaural Sound definition).
(Continued)

*Primary Examiner* — Jakieda R Jackson
(74) *Attorney, Agent, or Firm* — Meunier Carlin & Curfman LLC (57) ABSTRACT

A computerized system for deriving expression of intent from recorded speech includes: a text classification module comparing a transcription of recorded speech against a text classifier to generate a first set of representations of potential intents; a phonetics classification module comparing a phonetic transcription of the recorded speech against a phonetics classifier to generate a second set of representations; an audio classification module comparing an audio version of the recorded speech with an audio classifier to generate a third set of representations; and a discriminator module for receiving the first, second and third sets of the representations of potential intents and generating one derived expression of intent by processing the first, second and third sets together; where at least two of the text classification module, the phonetics classification module, and the audio classification module are asynchronous processes from one another.

20 Claims, 7 Drawing Sheets

Related U.S. Application Data continuation of application No. 15/407,623, filed on Jan. 17, 2017, now abandoned.

(51) Int. Cl.
*G10L 25/51* (2013.01)
*G10L 15/08* (2006.01)

(56) References Cited

U.S. PATENT DOCUMENTS

| | | | | |
|---|---|---|---|---|
| 2008/0046233 | A1* | 2/2008 | Chen | G10L 19/005 704/211 |
| 2008/0201133 | A1* | 8/2008 | Cave | G10L 15/1815 704/E15.024 |
| 2010/0023331 | A1* | 1/2010 | Duta | G10L 15/1822 704/275 |
| 2011/0307252 | A1* | 12/2011 | Ju | G10L 15/1822 704/E15.014 |
| 2014/0163998 | A1* | 6/2014 | Cormier | G10L 19/04 704/500 |
| 2017/0092262 | A1* | 3/2017 | Pinhasi | G10L 15/02 |

OTHER PUBLICATIONS

Big and Little Endian. http://www.cs.umd.edu/class/sum2003/cmsc311/Notes/Data/endian.Html (University of Maryland- Definitions) Feb. 2017. 4 pages. https://web.archive.org/web/20170227191944/htp://www.cs.umd.edu/class/sum2003/cmsc311/Notes/Data/endian.Html.

Signedness https://en.wikipedia.orglwiki/Signedness.

INT02-C. Understand integer conversion rules https://www.securecoding.cert.orgl confluence/display/c/INT02-C.+Understand+integer+conversion+rules by Robert C. Seacord, last modified by David Svoboda on Jan. 17, 2023.

Authors: Thomas Zawistowski & Paras Shah. 1992 An Introduction to Sampling Theory http://www2.egr.uh.edu/ -glover/ applets/ Sampling/Sampling.Html.

Oliver et al., "The Philosophy Of PCM", Proceedings of the IRE, vol. 36, Issue 11, Nov. 1948, pp. 1324-1331.

Malah, David, "Time-Domain Algorithms For Harmonic Bandwidth Reduction And Time Scaling Of Speech Signals" IEEE Transactions On Acoustics, Speech, and Signal Processing, vol. ASSP-27, No. 2, Apr. 1979, pp. 121-133.

Black, Paul E, "Phonetic Coding", Dictionary of Algorithms and Data Structures, NIST, Dec. 17, 2004.

Birkenes, Oystein, "A Framework For Speech Recognition Using Logistic Regression", Dissertation; Norwegian University of Science and Technology, 2007, 124 pages.

Greene, William H., "The Multinomial Logit Model", Discrete Choices and Event Counts, Chapter 18, Econometric Analysis, Seventh edition, Boston: Pearson Education, 2012, pp. 803-806.

Vardalas, John, "Pulse Code Modulation: It all Started 75 Years Ago with Alec Reeves", IEEE, Jun. 2013.

* cited by examiner

SYSTEMS AND METHODS FOR DERIVING EXPRESSION OF INTENT FROM RECORDED SPEECH

CROSS-REFERENCE TO RELATED APPLICATIONS

This application is a continuation to U.S. application Ser. No. 15/875,054, titled "COMPUTERIZED SYSTEM FOR TRANSFORMING RECORDED SPEECH INTO A DERIVED EXPRESSION OF INTENT FROM THE RECORDED SPEECH" filed May 18, 2021, which claims the benefit of the priority of U.S. application Ser. No. 15/407,623, filed Jan. 17, 2017, disclosures of which are incorporated herein by reference.

FIELD OF THE INVENTION

The present disclosure is in the technical field of speech recognition and language understanding. More particularly, it relates to a process of facilitating the detection of contextualized intentions within a given speech.

BACKGROUND OF THE INVENTION

Conventional Speech Recognition (SR) systems focus on obtaining the most accurate transcription from digitalized audio signals, these SR systems are known as Speech to Text (STT) systems, the transcription comes from dividing the audio signal into small segments which are then used to match phonemes (units of sound on a specific language), and chain them in order to build up words and sentences. Current STT systems implement statistical models to determine phonemes and words, this recognition is based on built-in dictionaries and language and acoustic models.

STT systems are sometimes used in conjunction with other procedures or systems to determine intentions rather than just transcriptions. This linear process where the output of the STT system is used to determine the intention, requires a very precise transcription process which is often affected by the most common problems of SR systems, including, but not limited to, background noise, multi-source speech (overlapped speech) and homonyms (words with different meaning which base phonemes are similar), all of which can alter the input audio signal and in return the intent recognition.

Most systems that interact with intentions or commands (home automation systems or virtual assistants) usually have a limited yet contextualized knowledgebase (KB). Basically, a system built for home automation may accept commands related only to that specific porpoise, rather than financial or medical terms, in consequence, relaying on pre-trained third party or external STT systems with nonspecific content is not a suitable option, in this case, the best alternative is to use a speech to text engine, which dictionary and language model can be trained with custom content obtained from the KB, by doing so, the problem of sending unrecognizable transcriptions to the command or intention system has been solved, but the prior issues remain, the linear, transcription reliable process and the common STT problems. Therefore, there is a need to augment the precision in the intent recognition process, which main focus is not transcription but intention and that does not follow a linear procedure but rather leverages the calculation of the result to a systematic multi-part analytical process.

SUMMARY

The present disclosure implements multiple asynchronous processes (processes that do not depend on each other's outcomes and may therefore occur on different threads simultaneously) that analyze input data in different ways to determine, by discrimination of result confidence values (weights), an intent from a giving speech audio signal. The multi-asynchronous intention recognition system introduced by this invention helps circumvent the problems mentioned and enhance the accuracy of the intent recognition process.

In an aspect of the current disclosure, a computerized system for transforming recorded speech into a derived expression of intent from the recorded speech includes: (1) a text classification module comparing a transcription of at least a portion of recorded speech against a text classifier to generate a first set of one or more of the representations of potential intents based upon such comparison; (2) a phonetics classification module comparing a phonetic transcription of at least a portion of the recorded speech against a phonetics classifier to generate a second set of one or more of the representations of potential intents based upon such comparison; (3) an audio classification module comparing an audio version of at least a portion of the recorded speech with an audio classifier to generate a third set of one or more of the representations of potential intents based upon such comparison; and a (4) discriminator module for receiving the first, second and third sets of the one or more representations of potential intents and generating at least one derived expression of intent by processing the first, second and third sets of the one or more representations of potential intents together; where at least two of the text classification module, the phonetics classification module and the audio classification module are asynchronous processes from one another. In a more detailed embodiment, each of the text classification module, the phonetics classification module and the audio classification module are asynchronous processes from one another.

This aspect of the disclosure may further include one or more databases containing: (a) the plain text classifier including representations of a plurality of potential intents that may be derived from the corresponding speech, and for each potential intent, key words corresponding to a plurality of different potential expressions for such potential intent; (b) the phonetics classifier including representations of the plurality of potential intents that may be derived from the corresponding speech, and for each potential intent, phenomes for key words corresponding to a plurality of different potential expressions for such potential intent; and (c) the audio classifier including representations of the plurality of potential intents that may be derived from the corresponding speech, and for each potential intent, audio features for machine generated audio signals generated for a corresponding plurality of different potential expressions for such potential intent.

Alternatively, or in addition, at least one of the text classification module, the phonetics classification module and the audio classification module lie on a parallel processing path with another of the text classification module, the phonetics classification module, and the audio classification module.

Alternatively, or in addition, the system may further include a speech to text engine receiving the recorded speech and generating a keyword based transcription from the recorded speech for use by each of the text classification module and the phonetics classification module.

Alternatively, or in addition, each of the text classification module, the phonetics classification module and the audio classification module respectively calculate confidence scores associated with the first, second and third sets of the one or more representations of potential intents; and the discriminator module generates at least one derived expression of intent by processing the first, second and third sets of the one or more representations of potential intents and associated confidence scores together.

In another aspect of the current disclosure, a computerized system for transforming recorded speech into a derived expression of intent from the recorded speech includes: (1) a speech to text engine receiving recorded speech and generating a keyword based transcription from the recorded speech; (2) a text classification module receiving the keyword based transcription and comparing the keyword based transcription against a plain text classifier to generate a first set of one or more of the representations of potential intents and an associated confidence score based upon such comparison; (3) a phonetics classification module receiving the keyword based transcription and comparing a phonetic version keyword based transcription against a phonetics classifier to generate a second set of one or more of the representations of potential intents and an associated confidence score based upon such comparison; (4) an audio classification module receiving a normalized version of the recorded speech and comparing the normalized version of the recorded speech with an audio classifier to generate a third set of one or more of the representations of potential intents and associated confidence scores based upon such comparison; and (5) a discriminator module for receiving the first, second and third sets of the one or more representations of potential intents and generating at least one derived expression of intent by processing the first, second and third sets of the one or more representations of potential intents together. In a more detailed embodiment, the system may further include one or more databases containing: (a) the plain text classifier including representations of a plurality of potential intents that may be derived from the corresponding speech, and for each potential intent, key words corresponding to a plurality of different potential expressions for such potential intent; (b) the phonetics classifier including representations of the plurality of potential intents that may be derived from the corresponding speech, and for each potential intent, phenomes for key words corresponding to a plurality of different potential expressions for such potential intent; and (c) the audio classifier including representations of the plurality of potential intents that may be derived from the corresponding speech, and for each potential intent, audio features for machine generated audio signals generated for a corresponding plurality of different potential expressions for such potential intent.

Alternatively, or in addition, in this aspect of the current disclosure at least one of the text classification module, the phonetics classification module and the audio classification module lie on a parallel processing path with another of the text classification module, the phonetics classification module and the audio classification module. In a further detailed embodiment, each of the text classification module, the phonetics classification module and the audio classification module lie on parallel processing paths.

Alternatively, or in addition, in this aspect of the current disclosure the computerized system may further include (6) a measure distance module receiving the keyword based transcription and running distance algorithms between the keyword based transcription against the plain text classifier to generate a fourth set of one or more of the representations of potential intents and an associated confidence score; wherein the discriminator module for receives the first, second, third and fourth sets of the one or more representations of potential intents and generates at least one derived expression of intent by processing the first, second, third and fourth sets of the one or more representations of potential intents together.

Another aspect of the present disclosure may include the combination of the methods used to train the system, using speech synthesis (artificial production of human speech), audio signal classification procedures and keyword driven STT recognition.

Embodiments of the current disclosure can be inferred as a pipeline where its parts do not necessarily need to follow a specific order to provide a solution to the aforementioned problems. Embodiments of the current disclosure provide a combination of functionalities to help overcome problems of traditional SR, and specifically, STI (speech to intent) systems. In the disclosed embodiments, data is loaded by a core module, where this data can be entered online or as part of a batch process from another system. In the disclosed embodiments, there are three primary parallel processes that are used to build a data set that is then used by the pipeline to run the disclosed speech to intent system.

The three primary parallel processes include an audio classifier, a phonetics classifier and a plain text classifier. A synthesizer creates audible digital binary data from the audio input that is fed to the audio classifier. A speech to text (STT) translator converts the audio input into text to feed the phonetics classifier and the plain text classifier. The STT translator uses a custom dictionary and n-gram set built from the intents. The plain text classifier uses Questions (intents) and Alternates (various ways of expressing such intents) as raw text data as a build for its classifier.

In an embodiment, the pipeline begins when a user's speech analog wave is converted into digital data. This converted digital signal is normalized or altered using two asynchronous functions. One of these functions will normalize the signal to make it suitable for the STT module. The other will modify the converted digital signal for the audio classifier so that it matches specifications of audio intents stored in an audio patterns database. This other converted digital signal is used by the audio classifier to create a list of results with intents and scores based on the Logistic Regression model. More specifically, the audio classifier will apply distortions to the audio input to match the synthesizer's characteristics; the sample is then classified using a logistical regression model; and the results are used to create a result matrix with the confidence scores associated with the set of classifications generated by the classifier.

The STT module has a custom language model built from a custom-trained intent corpus. Using this model, n-gram and TF-IDF sequences are run against the input to determine keywords, relevant word collections, and to identify matches with intents. The output of the STT module is sent along two paths: a Plain Text Classifier and a Phonetics Classifier.

The Plain Text Classifier implements the Bayes model and stores the intents as raw text. Using text as input, the classifier determines appropriate matches and builds up its own result matrix with a custom dictionary and language model build from the intent corpus.

The Phonetics Classifier uses a phonetics algorithm to index words by their pronunciation. The phonetics algorithm takes STT input, converts it to its phonetic version and tries to find a match against the phonetics classifier. The scores are then stored in another result matrix.

After the three main analytical algorithms have generated their respective result matrices, their results are parsed to build a meta-data matrix that includes a phonetics representation distance score and a plain distance score. The phonetics representation distance score is generated by a comparative distance algorithm against phonetics version of intents. The plain distance score is generated used the same distance algorithm against plaint text version of intents.

BRIEF DESCRIPTION OF THE DRAWINGS

The previously mentioned advantages and procedures will become more easily understandable by considering the subsequent detailed description and the following accompanied drawings.

GLOSSARY

Multinomial Logistic Regression: Multinomial logistic regression is a classification method that generalizes logistic regression to multiclass problems, such as those with more than two possible discrete outcomes. For instance, multinomial logistic regression is used to predict the probabilities of the different possible outcomes of a categorically distributed dependent variable, given a set of independent variables.

Moreover, multinomial logistic regression is used when the dependent variable in Question is nominal, such that it falls into any one of a set of categories which cannot be ordered in any meaningful way, and for which there are more than two categories. Thus, multinomial logistic regression is a particular solution to the classification problem that assumes that a linear combination of the observed features and some problem-specific parameters can be used to determine the probability of each particular outcome of a dependent variable.

See also: Greene, William H. *Econometric Analysis* (Seventh ed.). *Boston: Pearson Education,* 2012, pp. 803-806; and Belsley, David. *Conditioning Diagnostics: Collinearity and Weak Data in Regression.* New York: Wiley, 1991.

Monaural: Monaural sound is a format for sound output in an audio system in which audio signals are mixed and then routed through a single audio channel. Monaural sound is also known as monophonic sound reproduction or simply mono. Monaural sound is intended to be heard as if it were a single channel of sound perceived as coming from one position. For example, monaural differs from stereo, which uses two channels to convey the impression of sound coming from different places. Although only one loudspeaker is necessary in a monaural sound system, when played through multiple loudspeakers or headphones, identical signals are fed through wires into each speaker, resulting in the perception of a one-channel sound.

See also: haps://www.techopedia.com/definition/31085/monaural-sound (Monaural Sound definition)

Endianness: Endianness refers to the order of the bytes comprising a digital word in computer memory. It also describes the order of byte transmission over a digital link. Words may be represented in big-endian or little-endian format. For example, when storing a word in big-endian format, the most significant byte is stored first and the following bytes are stored in order of decreasing significance, such that the least significant byte is stored last. On the contrary, when storing a word in little-endian format, the least significant byte is stored first, and the most significant byte is stored last.

See also: http://www.cs.umd.edu/class/sum2003/cmsc311/Notes/Data/endian.html (University of Maryland—Definitions)

Audio File Format: An audio file format is a file format for storing digital audio data on a computer system. The data can be a raw bitstream in an audio coding format or embedded in a container format or an audio data format with a defined storage layer. The bit layout of the audio data is called the audio coding format. The three major groups of audio file formats are: uncompressed audio formats, lossless compression formats, and lossy compression formats.

Uncompressed audio formats encode both sound and silence with the same number of bits per unit of time. For instance, encoding an uncompressed minute of absolute silence produces a file of the same size as encoding an uncompressed minute of music. A lossless compressed format, on the other hand, stores data in less space without losing any information since the original uncompressed data can be recreated from the compressed version. Thus, in a lossless compressed format, encoding compressed music would occupy a smaller file than an uncompressed format and the silence would take up almost no space at all. Lossy compression enables even greater reductions in file size by removing some of the audio information and simplifying the data, which may result in a reduction in audio quality. Most formats offer a range of compression generally measured in bit rate, wherein the lower the rate results in a smaller file and a more significant loss of quality.

Pulse-Code Modulation Sign: Signedness in computing is a property of data types representing numbers in computer programs. A numeric variable is signed if it can represent both positive and negative numbers, and unsigned if it can only represent non-negative numbers (zero or positive numbers). Since signed numbers can represent negative numbers, they lose a range of positive numbers that can only be represented with unsigned numbers of the same size because half the possible values are non-positive values. Unsigned variables, on the other hand, can dedicate all the possible values to the positive number range. For example, a signed 16-bit integer can hold the values −32768 to 32767 inclusively, while an unsigned 16 bit integer can hold the values 0 to 65535. For this sign representation method, the leftmost bit is the most significant bit and denotes whether the value is positive or negative (0 for positive, 1 for negative).

See also: https://en.wikipedia.org/wiki/Signedness; and https://www.securecoding.cert.org/confluence/display/c/INT02-C.+Understand+integer+conversion+rules Pulse-Code Modulation: Pulse-code modulation (PCM) is a method used to digitally represent sampled analog signals. Further, PCM is the method of encoding generally used for uncompressed audio and is the standard form of digital audio in computers, Compact Discs, digital telephony and other digital audio applications. PCM audio is coded using a combination of various parameters, including resolution/ sample size and byte order, among others. In a PCM stream, the amplitude of the analog signal is sampled regularly at uniform intervals, and each sample is quantized to the nearest value within a range of digital steps. A PCM stream has two basic properties that determine the stream's fidelity to the original analog signal: the sampling rate, which is the number of times per second that samples are taken; and the bit depth, which determines the number of possible digital values that can be used to represent each sample. Some pulse-code modulation types include linear PCM, logarithmic PCM, differential PCM and adaptive PCM. In linear PCM, the quantization levels are linearly uniform, which is in contrast to PCM encodings where quantization levels vary as a function of amplitude. Logarithmic PCM coding plots the amplitudes on a logarithmic scale. Differential PCM values are encoded as differences between the current and the previous value. In adaptive PCM, the size of the quantization step is varied to allow further reduction of the required bandwidth for a given signal-to-noise ratio.

See also: Vardalas, John. *Pulse Code Modulation: It all Started 75 Years Ago with Alec Reeves*. IEEE, June 2013.

B. M. Oliver; J. R. Pierce & C. E. Shannon. *The Philosophy of PCM*. Proceeding of the IRE 36 (11): 1324-1331, November 1948.

Sampling (Signal Processing): Sampling in signal processing is the reduction of a continuous signal to a discrete signal, such as the conversion of a sound wave (a continuous signal) to a sequence of samples (a discrete-time signal). Each sample is a value or set of values at a point in time and/or space, and a sampler is a subsystem or operation that extracts samples from a continuous signal. In other words, the value of the signal is measured at certain intervals in time, wherein each measurement is referred to as a sample. If the signal contains high frequency components, sampling at a higher rate may be necessary to avoid losing information that is in the signal.

See also: http://www2.egr.uh.edu/~glover/applets/Sampling/Sampling.html; and

Proakis, J. and Manolakis, D. *Digital Signal Processing: Principles, Algorithms, and Applications*. New York: Macmillan Publishing Company, 1992.

Phonetic algorithm: A phonetic algorithm is an algorithm for indexing of words by their pronunciation. Most phonetic algorithms are based on the English language.

See also: Black, Paul E. *"Phonetic Coding"*. Dictionary of Algorithms and Data Structures. NIST.

Time-Domain Pitch Synchronous Overlap and Add: Pitch Synchronous Overlap and Add (PSOLA) is a digital signal processing technique used for speech processing, and more specifically speech synthesis. It can be used to modify the pitch and duration of a speech signal. PSOLA works by dividing the speech waveform in small overlapping segments. To change the pitch of the signal, the segments are moved further apart to decrease the pitch, or closer together to increase the pitch. To change the duration of the signal, the segments are repeated multiple times to increase the duration or eliminated to decrease the duration. The segments are then combined using the overlap add technique.

Time-Domain Pitch Synchronous Overlap and Add (TD-PSOLA) is used to modify the fundamental frequency and duration of speech signals, without affecting the segment identity, e.g., without changing formats. For example, TD-PSOLA is used in the time domain to determine the period of a given section of a wave using a pitch detection algorithm.

See also: Malah, David. *Time-Domain Algorithms for Harmonic Bandwidth Reduction and Time Scaling of Speech Signals*. IEEE Transactions on Acoustics, Speech, and Signal Processing. ASSP-27 (2): 121-133, April 1979.

Speech Synthesis: Speech synthesis is the artificial production of human speech, often using a computer system such as a speech synthesizer. A text-to-speech (TTS) system converts normal language text into speech, whereas other systems render symbolic linguistic representations like phonetic transcriptions into speech. Synthesized speech can be created by concatenating pieces of recorded speech that are stored in a database, however, the storage of entire words or sentences allows for high-quality output. Alternatively, a synthesizer incorporates a model of the vocal tract and other human voice characteristics to create a voice output.

See also: Allen, Jonathan; Hunnicutt, M. Sharon; Klatt, Dennis. *From Text to Speech: The MITalk system*. Cambridge University Press, 1987.

Noise Reduction: Noise reduction is the process of removing noise from a signal. Both analog and digital recording devices are susceptible to noise. Noise can be random or white noise with no coherence, or coherent noise introduced by the device's mechanism or processing algorithms. In the audio field, for example, tape hiss is a common form of noise in electronic recording devices that is caused by random electrons that stray from their designated path due to being heavily influenced by heat. Such stray electrons can influence the voltage of the output signal, thus creating detectable noise.

Some types of noise reduction include single-ended pre-recording, single-ended hiss reduction, single-ended surface noise reduction, and codec or dual-ended systems. Single-ended pre-recording systems affect the recording medium at the time of recording. Single-ended hiss reduction systems reduce noise as it occurs, including both before and after the recording process. Single-ended surface noise reduction applies to the playback of phonograph records to attenuate the sound of scratches, pops, and surface non-linearities. Codec or dual-ended systems apply a pre-emphasis process during recording, and also apply a de-emphasis process at playback.

DETAILED DESCRIPTION

Figure 1:
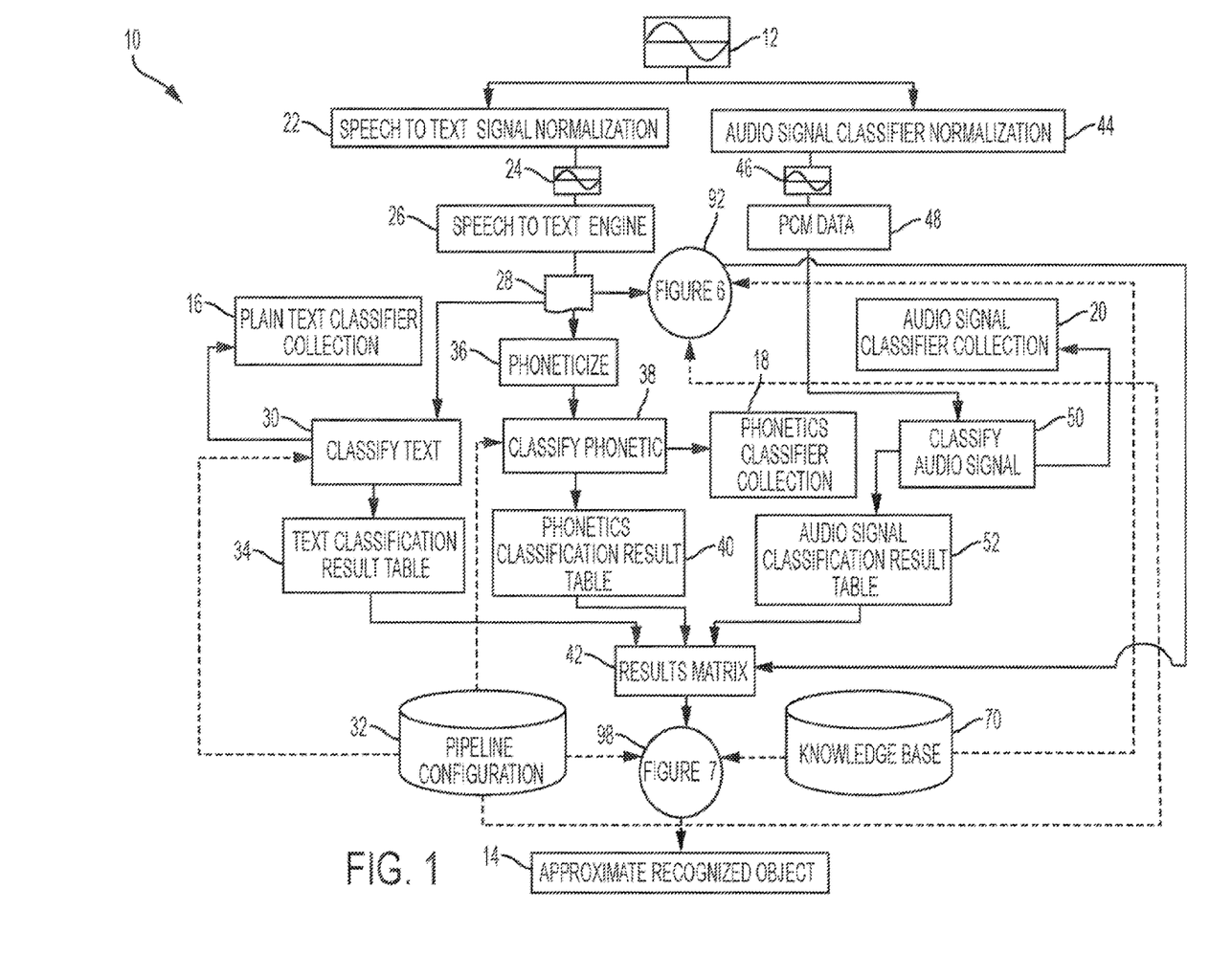
FIG. 1 illustrates the overall pipeline components and procedures that take place in order to determine an intention according to an exemplary embodiment.

FIG. 1 is a schematic diagram of an example intent recognition pipeline setup 10 that can be used to classify an audio signal input 12 and build an approximate recognized object 14 containing a confidence weighted set of results. The three main components of this schematic are the plain text classifier collection 16, the phonetics classifier collection 18 and the audio signal classifier collection 20, all of them containing an array of classifiers based on logistic regression classification algorithms (see Glossary for "Multinomial logistic regression").

A speech to text signal normalization process 22 formats the audio file to generate a single-channel (monaural), little-endian, header-less 16-bit signed PCM audio file sampled at 16000 Hz 24 (see Glossary for "Monaural," "Endianness," "audio file format," "PCM," "PCM sign," and "Sampling"). The output file is then sent to the speech to text engine 26 where the keyword based transcription process begins, this process will be described in more detail in FIG. 5.

The keyword based transcription output 28 is utilized by three different tasks as input. One of these components is the classify text process 30 that iterates over the classifiers inside the plain text classifier collection 16. Each iteration outputs a result set containing the labels and confidence values assigned during the classification process, the results with lower values than a preset accuracy classification threshold stored in the pipeline configuration database 32 may be dismissed before the result set is merged into the text classification result table 34.

The second process where the keyword based transcription 28 is utilized is the phoneticize module 36, which outputs the phonetic version of the transcription by using a phonetic algorithm (see Glossary for "Phonetic Algorithm"), this output is used by the classify phonetic process 38 which iterates over the phonetics classifier collection 18 and builds the phonetics classification result table 40, merging the results of each iteration where the values are equal or higher than an accuracy classification threshold defined in the pipeline configuration database 32.

Figure 6:
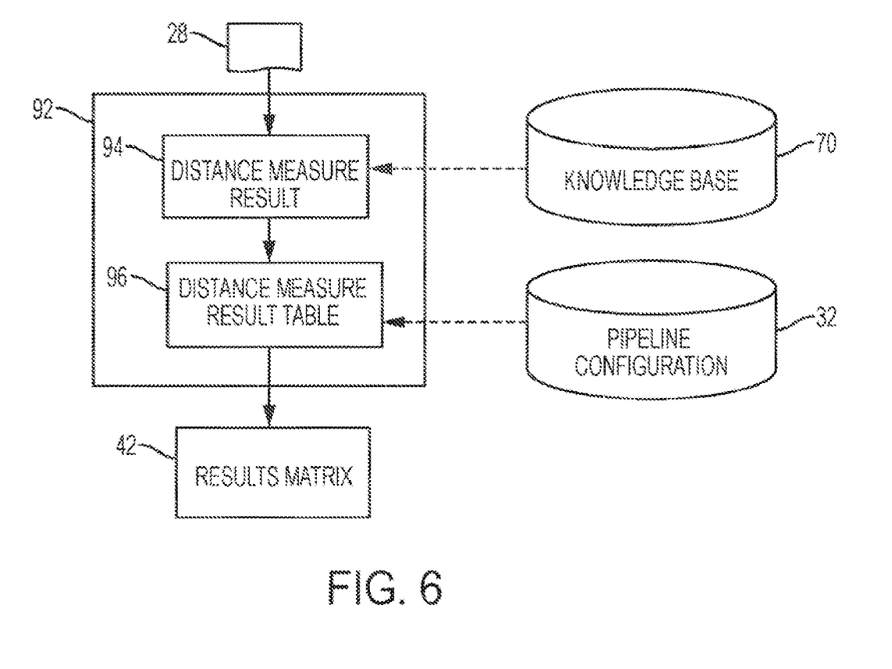
FIG. 6 shows the components and procedures executed to build the distance measure result table according to an exemplary embodiment.

The third process that uses the keyword based transcription 28 is the measure distance module, which process is described in FIG. 6, the results of these three processes are used to build a results matrix 42.

The audio signal classifier normalization process 44 modifies the audio file input 12 using a Time-Domain Pitch Synchronous Overlap and Add (See Glossary) algorithm to modify its pitch and duration, to generate an output sample 46. This technique modifies the speech signal to make it more similar to the speech synthesis (See Glossary for "Speech Synthesis") generated samples stored in the audio signal classifier collection 20. The PCM data module 48 removes or reduces unvoiced sound (background noise) (see Glossary for "Noise Reduction") and updates the silence in the sample 46 to a specific length. The data is then used by the Classify Audio Signal process 50, to build a result table 52 that contains the merged data. More specifically, the Classify Audio Signal process 50 uses a feature selection step to parse the PCM data into predefined segments/ranges/windows (milliseconds of the signal, for example, where a certain pitch can be found, rather than the entire signal), and then uses a classification step to compare the parsed PCM data against the machine-synthesized version of the text corpus in the Audio Signal Classifier collection 20 (see discussion of FIG. 4 below) to match Alternates in the classifier 20 and to assign a confidence value on the match. Specific algorithms for performing this match can be found in Birkenes, "*A Framework for Speech Recognition using Logistic Regression,*" *Dissertation, Department of Electronics and Telecommunications Norwegian University of Science and Technology,* 2007. The audio signal classification result table 52 is then sent to the results matrix 42.

Figure 7:
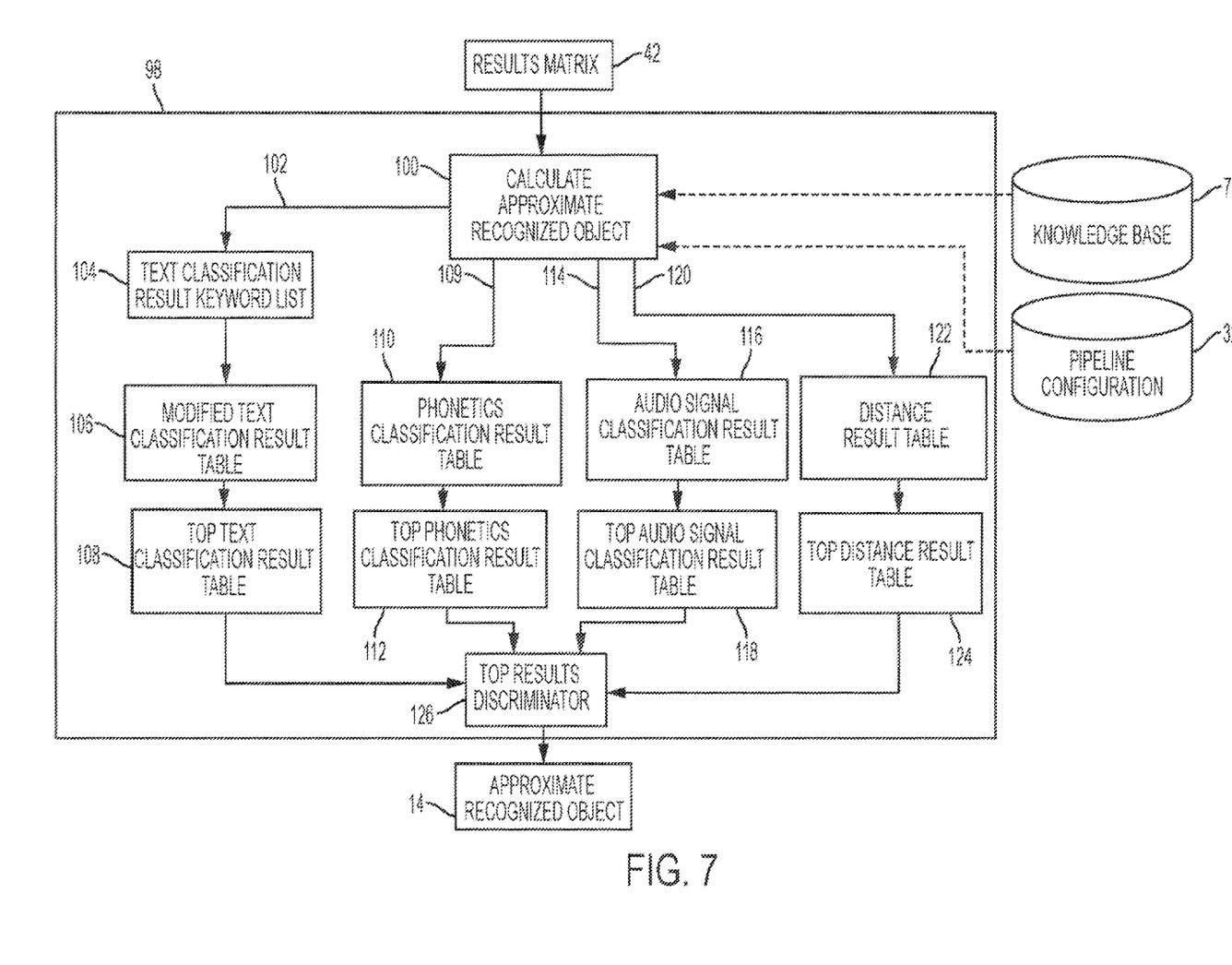
FIG. 7 shows the components, procedures, and logic behind calculating an intention using the combined results from the previous tasks according to an exemplary embodiment.

Once the results matrix 42 has the combined result tables from the previous tasks or the transaction timeout limit defined in the pipeline configuration database 32 has been reached the system begins to calculate the approximate recognized object 14 by modifying the sub-results, combining weights, and assigning confidence classification scores, this process is explained more in detail in FIG. 7.

Figure 2:
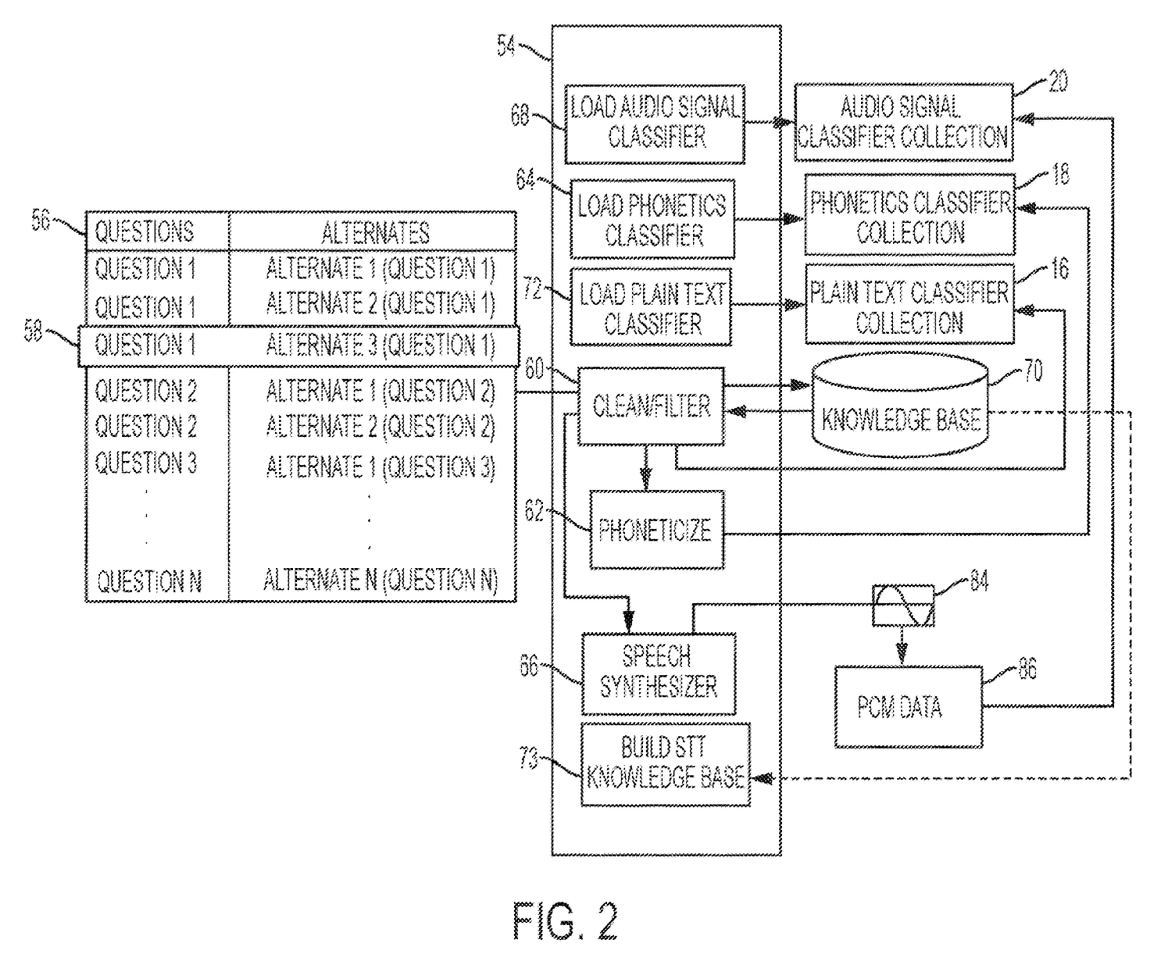
FIG. 2 illustrates the components and procedures followed to train the system with new data according to an exemplary embodiment.

FIG. 2 illustrates the components and procedures followed to train the system with new data. Specifically, FIG. 2 illustrates the training process 54 for training the plain text classifier collection 16, the phonetics classifier collection 18 and the audio signal classifier collection 20 for use in the pipeline process 10 of FIG. 1.

Input into the training process 54 is a training file 56 (e.g., an Excel file or a CSV file that has been manually generated to train the system), which includes a list of Questions (e.g., "Question 1," "Question 2," "Question 3," and so on) and for each Question, a list of Alternates, which are Alternate wordings/phrasings for the same Question (e.g., for "Question 1," there may be "Alternate 1 (Question 1)," "Alternate 2 (Question 1)," "Alternate 3 (Question 1)" and so on). Each Alternate is going to be associated with the Question and are going to be processed as the many various ways of asking for the same thing (or making the same request, statement or otherwise). For that reason, at least one of Alternatives will be identical to the Question, while the other Alternatives will be different ways of asking the same Question (request, statement, etc.) As an example, Question 1 may be "I want to make a payment," and Alternate 1 (Question 1) may be "I want to make a payment," Alternate 2 (Question 1) may be "I want to pay my bill," Alternate 3 (Question 1) may be "I wish to pay an installment" and so forth. Each Question/Alternate is considered a Question/Alternate pair 58. For the purpose of the current disclosure, the Questions are the "intents" of the spoken signal from which the process is attempting to determine, and the Alternates are the different ways in which such "intents" can be expressed.

The Question/Alternate pairs 58 are processed iteratively by the training process 54 until a predetermined limit reached. The Alternates in each Question/Alternate pairs 58 are first cleaned/filtered by the module 60, which cleans out or corrects unnecessary elements such as capitalization, punctuation, symbols, extra spaces and other errors. The output of this cleaning/filtering module 60 is then sent to three training processes: a phoneticizer module 62 for generating phoneticized versions of the Alternates in the Question/Alternate pairs 58 for the phonetics classifier 64; a speech synthesizer module 66 for machine-synthesizing audio speech signals for the Alternates in the Question/Alternate pairs 58 for the audio signal classifier 68; and also sent to knowledge base 70 for use by the plain text classifier 72.

Figure 3:
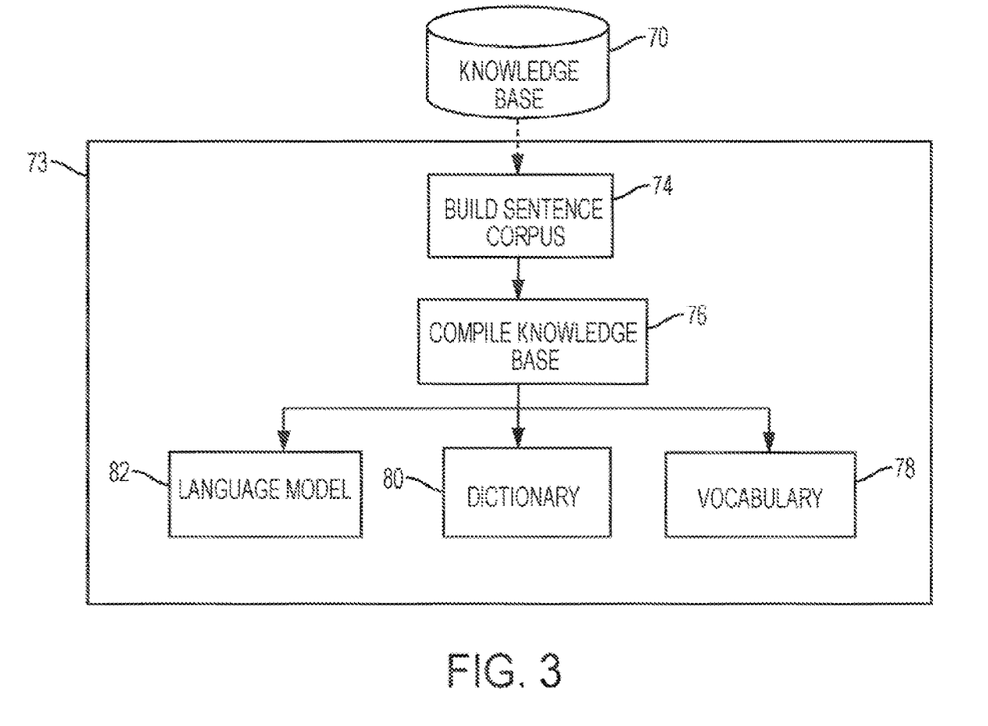
FIG. 3 shows the STT keyword based training procedure according to an exemplary embodiment.

FIG. 3 illustrates the speech to text (STT) keyword based training procedure of FIG. 2. Referring to FIGS. 2 and 3, cleaned Alternates in the Question/Alternate pairs 58, stored in the knowledge base 70, are processed by keyword training module 73 responsible for building the speech to text knowledge base. A first step 74 in the keyword training module 73 is to build a sentence corpus for all the Alternates associated with a Question. For example, the sentence corpus for the Question, "I want to make a payment" will be all the words comprising all Alternates for this specific Question. This sentence corpus is then processed in a next step 76 to compile three knowledge bases from the corpus, a Vocabulary knowledge base 78, a Dictionary knowledge base 80 and a Language Model knowledge base 82. Step 76 involves utilization of a td-idf (term frequency—inverse document frequency) algorithm, which determines relevant words in the corpus to build the language model (see https://en.wikipedia.org/wiki/Tf%E2%80%93idf for further details). An additional algorithm that compliments the tf-idf algorithm may include a statistical process that determines which words are synonyms between Alternates (if the relevant word is different for a different Alternate for the same Question), which may be run by the end of the parsing process of each group of Alternates per Question.

In the Vocabulary knowledge base 78, one instance of every single word from the sentence corpus (e.g., from all Alternates) for a given Question is present along with a weighted value associated with that word. For example, key words, such as "I," "want," and "to" may have lower weights because they appear in many of the Alternates and are determined to not be key to understanding a specific intent, while key words such as "make" and "payment" may have higher weights because they are determined to be key to understanding a specific Question. The Vocabulary knowledge base 78 may be seen as a document with all of the words and weights determined from the sentence corpus and may be used by the speech-to-text engine 26 when performing isolated word recognition after feature extraction.

In the Dictionary knowledge base 80 contains multiple versions of phonemes for each word in the corpus created by step 74. For example, the Dictionary knowledge base 80 may have phonemes for each possible way of pronouncing the words "want," "payment" and so forth. The Dictionary knowledge base 80 contains the phoneme distribution of each word. For example, CARD may become K-AA-R-D or FIND may become F-AY-N-D. The Dictionary knowledge base 80 may be used by the utterance detection and confidence assignment module 88 when dividing features into phonemes to assign a confidence value during word recognition.

In the Language Model knowledge base 82 confidence values are applied to each of the words in the corpus based upon a determination on whether such key words are key to show intent or are merely noise words. This knowledge base 82 is built using engrams (combinations of the same sentence and replacing similar words in the sentence structure) to help distinguish between key words showing intent and merely noise words.

Figure 4:
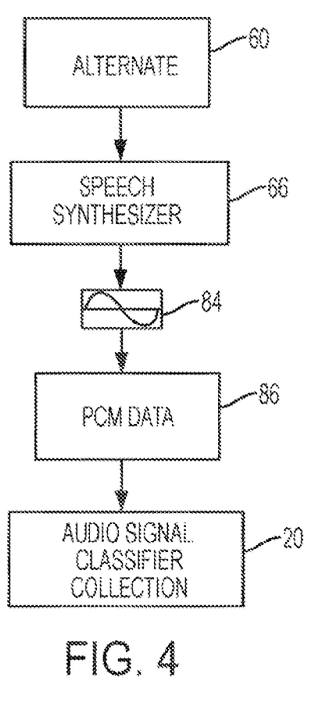
FIG. 4 illustrates the speech synthesis audio signal generation and audio signal classifier training according to an exemplary embodiment.

FIG. 4 provides additional details concerning speech synthesis audio signal generation and audio signal classification as used in the training process 54 of FIG. 2. Referring to FIGS. 2 and 4, as introduced above, the cleaned Alternate from the cleaning/filtering module 60 is sent to the speech synthesizer module 66 for machine-synthesizing audio speech signals for the audio signal classifier 68. More specifically, the speech synthesizer module 66 utilizes a phoneme set and parser function to build a machine generated audio signal 84. The PCM data module 86 is used to extract features (such as pitch, speed, frequency, high points, low points) from the machine generated audio signal 84 to generate a feature pattern for each cleaned Alternate from the cleaning/filtering module 60. The feature patterns generated by the PCM data module 86 are used to populate the audio signal classifier training set 20.

Figure 5:
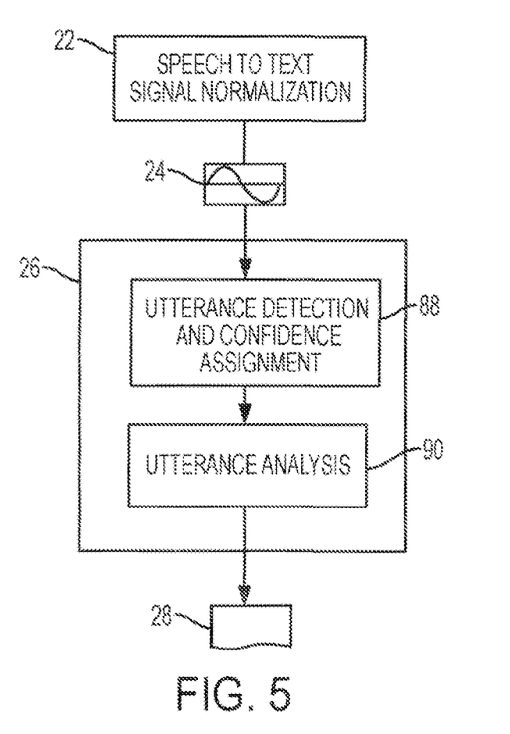
FIG. 5 shows the procedure executed to obtain a keyword based transcription according to an exemplary embodiment.

Referring now to FIGS. 1 and 5, the speech-to-text classification process utilizing the Language Model knowledge base 82, the Dictionary knowledge base 80 and the Vocabulary database 78 is described in further detail. As discussed above, the normalized audio file 24 is sent to the speech-to-text engine 26 to provide a keyword based transcription output 28. One process performed by the speech-to-text engine is utterance detection and confidence assignment 88. This utterance detection and confidence assignment module 88 divides the signal 24 into segments, which are then compared to a set of, for example, 40 known phonemes (e.g., the smallest type of sound in a language) in the English language, to build words from the matched phonemes. As part of this process, a confidence value is assigned to each word based upon the confidence level of the matched phonemes for that word. The confidence level is calculated based upon both the Dictionary knowledge base 80 and Vocabulary database 78 data and may be a calculation between the two. For example, after feature extraction a chopped signal may match a word in the Dictionary knowledge base 80, byte the last phoneme does not exactly match—providing two possible results. In this case the possible words are tacked in the Vocabulary database 80 to determine the accuracy of the recognition. In some cases, it may happen that one of the possible words in the Dictionary knowledge base 80 does not exist in the Vocabulary knowledge base 78 due to relevancy when building the Vocabulary knowledge base 78, and a higher confidence value may be assigned to the word that exists within the Vocabulary knowledge base 78. For more details, one can refer to chapter 5 of Birkenes, "*A Framework for Speech Recognition using Logistic Regression,*" *Dissertation, Department of Electronics and Telecommunications Norwegian University of Science and Technology,* 2007.

For example, the confidence value for each word can be an average confidence value assigned to each matched phoneme. As another example, or in addition, the confidence value for each word can be based upon a comparison of the word developed from the matched phonemes against the keywords established in the Dictionary knowledge base 80, the Vocabulary knowledge base 78 and/or the Language model knowledge base 82 from FIG. 3. In the Utterance Analysis module 90, by comparing the word developed from the matched phonemes against keywords in the three knowledge bases 78, 80, 82, the system can discard words that having confidence levels not meeting a certain threshold so that the intent classification is based upon known keywords (those in the knowledge bases 78, 80 and/or 82) as opposed to unknown keywords. These known keywords (exceeding a predetermined confidence level) are transcription output 28.

Referring now to FIGS. 1 and 6, the keyword distance measurement process 92 is described. The distance measurement process 92 utilizes a distance algorithm to calculate the differences between one extreme and another. Specifically, the distance measurement process 92 is going to take the key word transcription output 28 and calculate a distance value from each Alternate in the knowledge base 70 in the Distance Measure Result module 94 and to store the distance measurement results for each Alternate that exceed a certain threshold in the Distance Measure Result Table 96. Any results not meeting a predetermined threshold may be discarded. Within the table 96, the Alternates are unified to a Question or class because the output to the Results Matrix 42 is going to be a table of Questions and associated confidence/distance values.

Referring now to FIGS. 1 and 7, the process 98 for determining an approximate recognized object 14 from the results matrix 42 is described. In step 100, Calculate Approximate Recognized Object, the results matrix is parsed and segmented into various sub-results: the plain text classification results and confidence values, the phonetics classification results and confidence values, the audio signal classification results and confidence values, and the distance results and confidence values so that each may be processed separately. The Calculate Approximate Recognized Object module 100 may also obtain a modifier value from the Pipeline Configuration database 32 that may be applied against one or more of the sub-results sets.

For the plain text sub-results path 102, a first step 104 is to compare the keywords in the plain text sub-results with keywords from the known Alternates from the knowledge base 70, and to identify Alternates that have a certain number of keywords from the plain text sub-results and apply confidence values based upon the match between the sub-results keywords and the Alternates keywords. For example, this process may identify matches with Q1:A2, Q3:A4, Q5:A1, and then apply confidence values to each match. Then the modifier value may also be applied against the confidence values to increase the confidence values for the plain text sub-results versus other sub-results discussed below. This step will produce the modified text classification result table 106, which is the identity of each Question associated with the matching Alternates from step 104 along with the modified confidence value associate with that match. For example, such a table may identify Q1, Q3 and Q5 and have modified confidence values associated with each. From this table 106, the process in step 108, removes any of the modified text classification sub-results that do not exceed a certain threshold; or, alternatively, chooses a predetermined number of top results. So, in this example, step 108 determined that only Q1 and Q5 exceeded the threshold or were the top two results.

For the phonetics sub-results path 109, which includes a set of phonetics results and their confidence values, a first step 110 is to select those sub-results having a confidence value equaling or exceeding a predetermined threshold (from the Pipeline Configuration database 32); or, alternatively, taking a predetermined number of top results. The associated Questions corresponding to those top results are then places in a Top Phonetics Result Classification Result Table 112. As an example, assume that the phonetics sub-results included Q1:A3, Q2:A5, Q5:A1 and Q3:A2, and step 110 selected only Q5 and Q3 as meeting or exceeding the threshold; thereby storing Q5 and Q3 (along with their associated confidence values in table 112).

For the audio classifications sub-results path 114, which includes a set of audio classification results and their confidence values, a first step 116, is to select those sub-results having a confidence value equaling or exceeding a predetermined threshold (from the Pipeline Configuration database 32); or, alternatively, taking a predetermined number of top results. The associated Questions corresponding to those top results are then places in a Top Audio Signal Classification Result Table 118. As an example, assume that the audio classification sub-results included Q3:A2, Q5:A1 and Q4:A5, and step 110 selected only Q5 and Q3 as meeting or exceeding the threshold; thereby storing Q5 and Q3 (along with their associated confidence values in table 118).

Likewise, for the distance sub-results path 120, which includes a set of audio classification results and their confidence values, a first step 122, is to select those sub-results having a confidence value equaling or exceeding a predetermined threshold (from the Pipeline Configuration database 32); or, alternatively, taking a predetermined number of top results. The associated Questions corresponding to those top results are then places in a Top Audio Signal Classification Result Table 124. As an example, assume that the distance sub-results included Q1:A3, Q5:A1, Q7:A4 and Q2:A2, and step 110 selected only Q2 and Q7 as the top two results; thereby storing Q2 and Q7 (along with their associated distance confidence values in table 124).

The Top Results Discriminator module 126 then takes the results from the Top Text Classification Result Table 108, the Top Phonetics Classification Result Table 112, the Top Audio Signal Classification Result Table 118 and the Top Distance Result Table 124 and compares the respective results to determine the best Question(s) from the pipeline analysis. For example, to conduct this comparison the module 126 may take the results from the Top Text Classification Result Table 108 and compare those results with the other tables 112, 118 and 124; then do the same with the results from the Top Phonetics Classification Result Table 112 and so on. Each comparison may take each top result Question from each table and average the confidence values. From such a comparison, the module 126 may determine as the Approximate Recognized Object 14, which Question may be selected in most of the tables and/or has the highest average confidence values. In the ongoing example from above, the module 126 may choose Question 5 as the Approximate Recognized Object 14 because it was present in three of the four result tables, more than any other Question. Module 126 may also list the other Questions from the combined result tables and their associated average confidence scores. Alternatively, or in addition, Question 3 may be selected as the Approximate Recognized Object because the Module 126 determines that Question 3 has the highest average confidence score of all the results.

To provide additional context for various aspects of the current disclosure, such as, for example, the text classification process/module 30, the phonetics classification process/module 36 the audio classification process/module 50, and the discriminator process/module 126, the following discussion is intended to provide a brief, general description of a suitable computing environment in which the various aspects of the disclosure may be implemented. Those skilled in the art will recognize that embodiments of the disclosure also may be implemented in combination with various computer program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, networked or cloud-based computers or servers, as well as personal computers, hand-held wireless computing devices, microprocessor-based or programmable consumer electronics, and the like, each of which can be operatively coupled to one or more associated devices. Aspects of the disclosure may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information, and which may be accessed by the computer.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as known to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Following from the above description and invention summaries, it should be apparent to those of ordinary skill in the art that, while the methods and apparatuses herein described constitute exemplary embodiments of the present disclosure, it is to be understood that the embodiments contained herein are not intended to be limiting and that changes may be made without departing from the scope of the inventions as claimed. Likewise, it is to be understood that it is not necessary to meet any or all of the identified advantages or objects of the disclosure disclosed herein in order to fall within the scope of the claims, since inherent and/or unforeseen advantages of the present disclosure may exist even though they may not have been explicitly discussed herein. Finally, all references, article, document, or website cited above are incorporated herein by reference.

What is claimed is:

1. A computerized system for transforming recorded speech into a derived expression of intent from the recorded speech, the computerized system comprising:
   a speech-to-text normalizer computer comprising a plurality of programming instructions stored in a memory and operating on a processor, the plurality of programming instructions when executed by the processor cause the processor to:
   receive an audio file;
   convert the audio file to a converted single-channel audio file format;
   automatically transcribe the converted single-channel audio file format to produce a speech transcript comprising a written transcription of a selection of recorded speech within the single-channel formatted audio file;
   automatically analyze the speech transcript using a plurality of text classifiers to produce a plurality of labeled text classification results;
   assign a label and a confidence value, of a plurality of confidence values, to at least a portion of the speech transcript, wherein the confidence value is assigned based upon a comparison of the portion of the speech transcript, developed from one or more phonemes, with key words established in one or more of a dictionary knowledge base, a vocabulary knowledge base, and a language model knowledge base, and wherein the plurality of labeled text classification results are produced based on a comparison of the confidence value assigned by a text classifier, of the plurality of text classifiers, against a stored confidence threshold;
   process an audio classification, using an audio classifier, for at least a portion of the audio file using a time-domain pitch synchronous overlap to produce an audio output sample comprising an audio segment wherein the pitch and duration of the portion of the audio file have been modified, wherein the audio classifier is trained by:
      using a speech synthesizer module to generate a plurality of machine-synthesized audio speech signals that are each associated with a known intent for a given signal,
      extracting one or more features from the machine-synthesized audio speech signals to generate a feature pattern for each machine-synthesized audio speech signal,
      generating an audio signal classifier training set based on the feature patterns, and
      training the audio classifier using the audio signal classifier training set;

analyze a combined input to determine an expression of intent based on a comparison of the labels and the plurality of confidence values within the plurality of labeled text classification results and the pitch and duration of an audio segment within the audio output sample, the combined input comprising the plurality of labeled text classification results and the portion of the audio file,
wherein at least one of the plurality of labeled text classification results and the audio classification are asynchronous processes from one another; and
output the determined expression of intent.

2. The computerized system of claim 1, further comprising one or more databases comprising:
a plurality of potential intents that are derived from the portion of the audio file, wherein for each potential intent, of the plurality of potential intents, the key words correspond to a plurality of different potential expressions; and
a plurality of representations associated with the plurality of potential intents derived from the portion of the audio file, wherein for each potential intent, audio features for machine generated audio signals previously generated for a corresponding plurality of different potential expressions for each potential intent.

3. The computerized system of claim 2 wherein the plurality of programming instructions when further executed by the processor cause the processor to:
calculate one or more confidence scores associated with at least one set of the plurality of potential intents; and
generate at least one derived expression of intent by processing at least one set of the plurality of potential intents and associated one or more confidence scores together.

4. The computerized system of claim 1, wherein at least one of the plurality of text classifiers and the audio classifier lie on a parallel processing path with one another.

5. The computerized system of claim 1, wherein the plurality of programming instructions when further executed by the processor cause the processor to generate a keyword-based transcription from the portion of the audio file for text classification.

6. The computerized system of claim 1, wherein the plurality of programming instructions when further executed by the processor cause the processor to:
analyze the speech transcript using a plurality of phonetic classifiers to produce a phonetic transcript, comprising the pronunciation of each of the words contained within the speech transcript, wherein each of the plurality of phonetic classifiers indexes a plurality of words according to their pronunciation; and
provide the phonetic transcript as output.

7. The computerized system of claim 6, further comprising one or more databases comprising:
the one or more phenomes, previously derived by phonetics classification, using a phonetics classifier from the plurality of phonetic classifiers, for the key words correspond to a plurality of different potential expressions for each potential intent.

8. The computerized system of claim 6, wherein the phonetics classification and the audio classification are asynchronous processes from one another.

9. The computerized system of claim 8, wherein the plurality of programming instructions when further executed by the processor cause the processor to process the text classification, the phonetics classification, and the audio classification on parallel processing paths.

10. The computerized system of claim 6, wherein the plurality of programming instructions when further executed by the processor cause the processor to generate a keyword-based transcription from the portion of the audio file.

11. The computerized system of claim 6, wherein the plurality of programming instructions when further executed by the processor cause the processor to:
calculate confidence scores associated with the at least one set of the plurality of potential intents; and
generate at least one derived expression of intent by processing the at least one set of the plurality of potential intents and associated confidence scores together.

12. A computer-implemented method for transforming recorded speech into a derived expression of intent from the recorded speech, the method comprising:
receiving, by a speech-to-text normalizer computer, an audio file;
converting, by the speech-to-text normalizer computer, the audio file to a converted single-channel audio file format;
automatically transcribing, by the speech-to-text normalizer computer, the converted single-channel audio file format to produce a speech transcript comprising a written transcription of a selection of recorded speech within the single-channel formatted audio file;
automatically analyzing, by the speech-to-text normalizer computer, the speech transcript using a plurality of text classifiers to produce a plurality of labeled text classification results;
assigning, by the speech-to-text normalizer computer, a label and a confidence value, of a plurality of confidence values, to at least a portion of the speech transcript, wherein the confidence value is assigned based upon a comparison of the portion of the speech transcript developed from one or more phonemes with key words established in one or more of a dictionary knowledge base, a vocabulary knowledge base, and a language model knowledge base, and wherein the plurality of labeled text classification results are produced based on a comparison of the confidence value assigned by a text classifier against a stored confidence threshold;
processing, by the speech-to-text normalizer computer and using an audio classifier, an audio classification wherein the at least a portion of the audio file using a time-domain pitch synchronous overlap to produce an audio output sample comprising an audio segment wherein the pitch and duration of the portion of the audio file have been modified wherein the audio classifier is trained by:
using a speech synthesizer module to generate a plurality of machine-synthesized audio speech signals that are each associated with a known intent for a given signal,
extracting one or more features from the machine-synthesized audio speech signals to generate a feature pattern for each machine-synthesized audio speech signal,
generating an audio signal classifier training set based on the feature patterns, and
training the audio classifier using the audio signal classifier training set;
and
analyzing, by the speech-to-text normalizer computer, a combined input to determine an expression of intent based on a comparison of the labels and the plurality of confidence values within the plurality of labeled text classification results and the pitch and duration of an audio segment within the audio output sample, the combined input comprising the plurality of labeled text classification results and the portion of the audio file, wherein at least one of the plurality of labeled text classification results and the audio classification are asynchronous processes from one another; and outputting the determined expression of intent.

13. The method of claim 12, further comprising:

storing, by the speech-to-text normalizer computer, in one or more databases:

a plurality of potential intents that are derived from the portion of the audio file, wherein for each potential intent, of the plurality of potential intents, the key words correspond to a plurality of different potential expressions; and a plurality of representations associated with the plurality of potential intents derived from the portion of the audio file, wherein for each potential intent, audio features for machine generated audio signals previously generated for a corresponding plurality of different potential expressions for each potential intent.

14. The method of claim 13, further comprising:

calculating, by the speech-to-text normalizer computer, one or more confidence scores associated with at least one set of the plurality of potential intents; and generating, by the speech-to-text normalizer computer, at least one derived expression of intent by processing at least one set of the plurality of potential intents and associated one or more confidence scores together.

15. The method of claim 12, wherein at least one of the text classification and the audio classification are processed, by the speech-to-text normalizer computer, on a parallel processing path with one another.

16. The method of claim 12, further comprising generating, by the speech-to-text normalizer computer, a keyword-based transcription from the at least portion of the audio file for text classification.

17. The method of claim 12, further comprising:

analyzing, by the speech-to-text normalizer computer, the speech transcript using a plurality of phonetic classifiers to produce a phonetic transcript, comprising the pronunciation of each of the words contained within the speech transcript, wherein each of the plurality of phonetic classifiers indexes a plurality of words according to their pronunciation; and providing, by the speech-to-text normalizer computer, the phonetic transcript as output.

18. The method of claim 17, wherein the text classification, the phonetics classification, and the audio classification are performed, by the speech-to-text normalizer computer, on parallel processing paths.

19. The method of claim 17, further comprising generating, by the speech-to-text normalizer computer, a keyword-based transcription from the at least a portion of the audio file.

20. The method of claim 17, further comprising:

calculating, by the speech-to-text normalizer computer, confidence scores associated with the at least one set of the plurality of potential intents; and generating, by the speech-to-text normalizer computer, at least one derived expression of intent by processing the at least one set of the plurality of potential intents and associated confidence scores together.

* * * * *